United States Patent
Bonnerot et al.

(10) Patent No.: US 6,656,391 B1
(45) Date of Patent: Dec. 2, 2003

(54) PREPARATION BY SPRAY-DRYING OF A FLOWABLE URANIUM DIOXIDE POWDER OBTAINED BY DRY PROCESS CONVERSION OF $UF_6$

(75) Inventors: Jean-Marc Bonnerot, Puyricard (FR); Laurent Brunaud, Manosque (FR); Mireille Bauer, Manosque (FR)

(73) Assignees: Commissariat a l'Energie Atomique, Paris (FR); Compagnie Generale des Matieres Nucleaires, Velizy Villacoublay (FR)

( * ) Notice: Subject to any disclaimer, the term of this patent is extended or adjusted under 35 U.S.C. 154(b) by 0 days.

(21) Appl. No.: 09/831,916
(22) PCT Filed: Nov. 24, 1999
(86) PCT No.: PCT/FR99/02894
§ 371 (c)(1), (2), (4) Date: May 25, 2001
(87) PCT Pub. No.: WO00/30978
PCT Pub. Date: Jun. 2, 2000

(30) Foreign Application Priority Data

Nov. 26, 1998 (FR) .............................. 98 14901

(51) Int. Cl.⁷ ......................... C01G 43/025; G21G 4/00
(52) U.S. Cl. ........................ 252/643; 423/261; 376/901
(58) Field of Search ................. 423/261; 252/635, 252/643, 637; 376/901; 976/DIG. 96

(56) References Cited

U.S. PATENT DOCUMENTS

| | | |
|---|---|---|
| 3,394,997 A | 7/1968 | De Hollander |
| 3,845,193 A | 10/1974 | Littlechild et al. |
| 3,992,494 A | 11/1976 | Holden |
| 3,998,925 A | 12/1976 | Fuller |
| 4,617,158 A | 10/1986 | Braun et al. |
| 5,999,585 A * | 12/1999 | Dehaudt et al. ............. 376/421 |

FOREIGN PATENT DOCUMENTS

| | | |
|---|---|---|
| EP | 0 092 475 | 10/1983 |
| EP | 0 447 036 | 9/1991 |
| FR | 1 438 020 | 7/1966 |
| FR | 2 088 170 | 1/1972 |
| FR | 2 060 242 | 9/1972 |
| FR | 2 064 351 | 8/1974 |
| GB | 1 350 923 | 4/1974 |
| GB | 1 481 711 | 8/1977 |

OTHER PUBLICATIONS

J. S. Waddington, et al., Nucl. Energy, vol. 18, No. 4, pp. 283–287, "Development of Fuel Elements for the AGR", Aug. 1979.

T. Kawata, et al., Chemical Abstract, vol. 76, No. 18, 1 page, May 1, 1972, JP 07–113384, 1995.

* cited by examiner

Primary Examiner—Steven Bos
(74) Attorney, Agent, or Firm—Oblon, Spivak, McClelland, Maier & Neustadt, P.C.

(57) ABSTRACT

The invention relates to a process for preparing a castable powder of uranium dioxide $UO_2$, for use in the manufacture of MOX fuel.

This process comprises the following stages:

1) to prepare an aqueous suspension of a powder of $UO_2$ obtained by dry process from uranium hexafluoride, said suspension comprising 50 to 80% by weight of $UO_2$ and at least one additive chosen among deflocculation agents, organic binders, hydrogen peroxide $H_2O_2$ and a powder of $U_3O_8$, in such a quantity that the viscosity of the suspension does not exceed 250 mPa.sec, and 2) to atomise this suspension and dry it in a hot gas, at a temperature of 150 to 300° C., to obtain a castable powder of $UO_2$ with an average particle size of 20 to 100 μm.

16 Claims, 1 Drawing Sheet

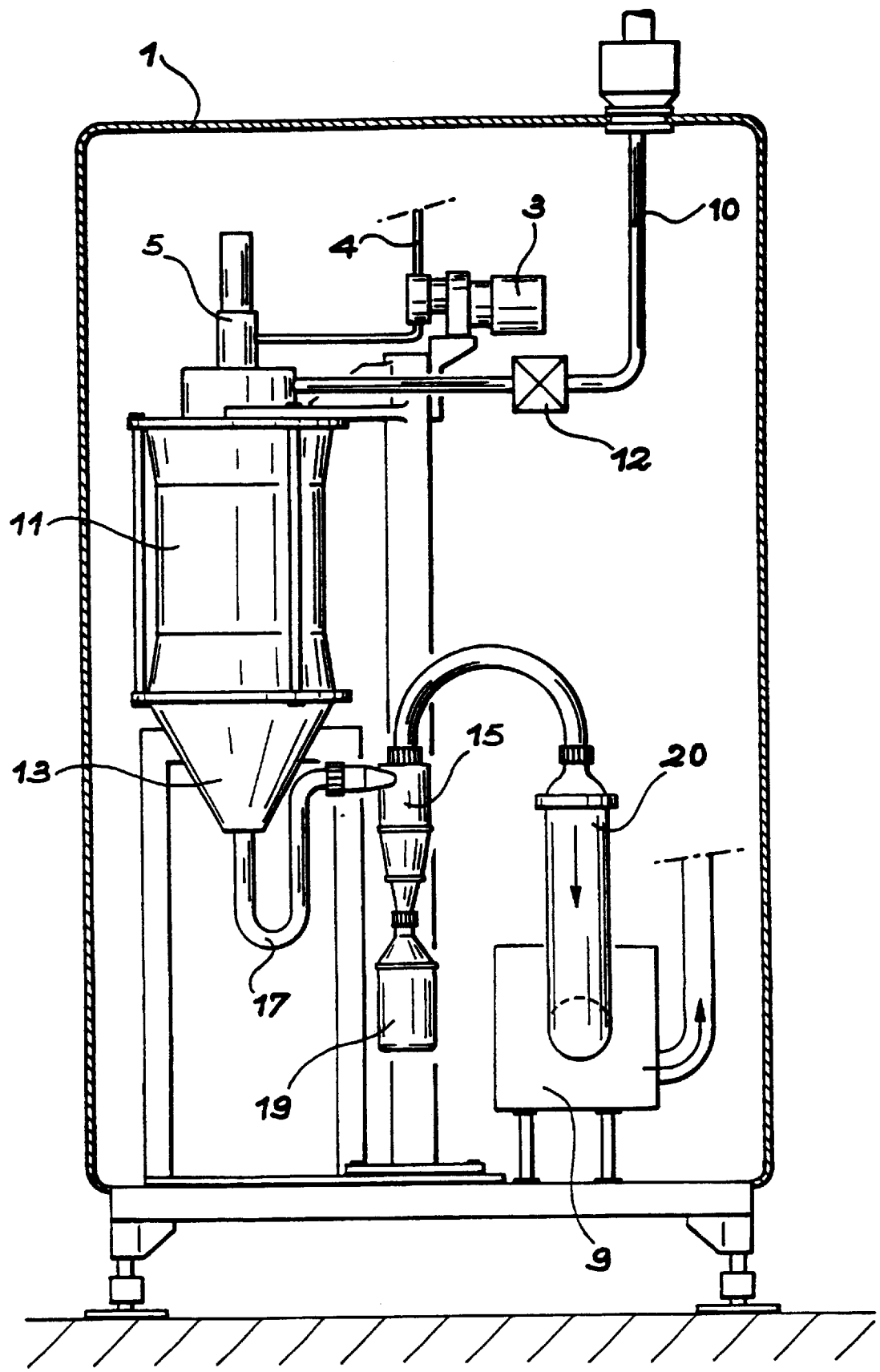

PREPARATION BY SPRAY-DRYING OF A FLOWABLE URANIUM DIOXIDE POWDER OBTAINED BY DRY PROCESS CONVERSION OF $UF_6$

TECHNICAL FIELD

The present invention relates to a process for preparing a powder of uranium dioxide with physico-chemical properties suitable for the preparation of a uranium and plutonium mixed oxide (MOX) fuel used in light water reactors.

More precisely, it relates to obtaining a powder which is castable, fine and with restricted particle size, intended to be mixed with another powder (a primary mixture rich in Pu) and which has the following properties:
- good spontaneous flow properties,
- a homogeneous particle size located in the range between 20 and 100 $\mu$m,
- a high apparent density to allow optimum filling of different equipment used for manufacturing fuel (grinder, mixer, containers, transfers, pressure foot feed, etc.),
- elementary particles sufficiently solid to withstand the different mechanical stresses undergone during manufacture (convection mixing, filling and emptying containers, transfer by pneumatic track, etc.),
- good compaction capability, and
- excellent reactivity to natural sintering.

STATE OF PRIOR ART

At present, a powder of uranium dioxide with these properties is obtained by preparing it by a wet conversion process of uranyl nitrate in uranium dioxide.

This wet conversion process consists of a precipitation of ammonium diuranate (ADU) followed or not by grinding to the appropriate particle size, as described in U.S. Pat. No. 3,394,997 [1], and U.S. Pat. No. 3,998,925 [2]. Document FR-A-2 088 170 [3] describes a conversion process of uranyl nitrate in sinterable uranium dioxide by drying-pulverisation of a solution of uranyl nitrate and formic acid, followed by calcination.

The powders obtained by these wet conversion processes can be used directly for the industrial manufacturing of MOX fuel without it being necessary to carry out a supplementary stage of mechanical granulation of the powder.

In fact, the powders have excellent flow properties, which give the final $UO_2$—$PuO_2$ mixture sufficient fluidity for withstanding the high output rates.

On the other hand, the preparation process of uranium dioxide using dry conversion of uranium hexafluoride $UF_6$ in $UO_2$, such as described in FR-A-2 060 242 [4] and FR-A-2 064 351 [5], does not make it possible at present to obtain a powder able to be used directly for manufacturing MOX fuels. Dry conversion of $UF_6$ is carried out industrially in a compact oven and plays on two reactions consecutively:

- the first is the hydrolysis reaction which transforms gaseous $UF_6$ into solid uranium oxyfluoride $UO_2F_2$,
- the second relates to the reducing pyrohydrolysis of $UO_2F_2$, which leads to the formation of $UO_2$ under pulverulent form.

The $UO_2$ powder produced according to the process described in [4] and [5] is difficult to use for preparing MOX fuels since it is usually cohesive and has a low apparent density, which makes direct utilisation very tricky for industrial application because of its very poor compaction behaviour.

When this process according to references [4] and [5] is used to prepare fuels with a base of $UO_2$ for reactors, granulation of the powder is next carried out by a mechanical process comprising a pre-compaction of the powder, followed by a crushing, then a sieving in order to obtain a mechanical granulate with good flow properties, which in certain circumstances is submitted to a spheroidizing operation to increase the castability of the powder further. This mechanical granulation leads to high particle sizes which can reach and even exceed 500 $\mu$m.

Another powder granulation technique for $UO_2$ has been described in FR-A-1 438 020 [6]. In this case, a paste is prepared by mixing a powder of $UO_2$ or $UO_2$—$PuO_2$, with a solution of a binder in an organic solvent with a very low hydrogen content, such as trichloroethylene, then drying this paste by pulverisation. Thus granulates of high dimension reaching 250 $\mu$m are obtained.

For manufacturing MOX fuel, where an intimate mixture of the two constituents ($UO_2$ powder and $PuO_2$ powder) is needed, such high particle sizes cannot be allowed for $UO_2$. It is indispensable to have $UO_2$ particle sizes lower than 100 $\mu$m in order to obtain the specifications required for this fuel.

The aim of the present invention is a treatment process for a uranium dioxide powder obtained by dry method, to convert it into a powder suitable for direct use in the manufacture of MOX fuel.

DESCRIPTION OF THE INVENTION

According to the invention, the process for preparing a powder of sinterable uranium dioxide $UO_2$ comprises the following stages:

1) to prepare an aqueous suspension of a powder of $UO_2$ obtained by dry process from uranium hexafluoride, said suspension comprising 50 to 80% by weight of $UO_2$ and at least one additive chosen among deflocculation agents, organic binders, hydrogen peroxide $H_2O_2$ and a powder of $U_3O_8$, in quantity such that the viscosity of the suspension does not exceed 250 mPa.sec, and 2) to atomise this suspension and dry it in a hot gas, at a temperature between 150° and 300° C., to obtain a powder of depleted $UO_2$ with an average particle size of 20 to 100 $\mu$m.

First of all, in this process, an aqueous suspension of uranium dioxide is prepared, comprising a very high dry matter content, but with a viscosity as low as possible, not exceeding 250 mPa.sec, so that it is suitable for the following operation of atomisation-drying of the suspension into calibrated granulates.

The fact that water is used to prepare the suspension is very interesting since it makes it possible to limit the quantities of organic products likely to introduce impurities into the final product to very low levels.

According to the invention, the method for preparing the suspension can be simple, quick, reproducible, and can lead to very fluid suspensions able to be carried by pumping to the injection nozzle of the atomiser without difficulty. Very high levels of dry material can be reached in order to obtain dense, full and completely spherical particles of powder. Furthermore, this process can be transposed to a production unit of industrial capacity.

In order to prepare this suspension, at least two additives are generally used, constituted respectively of:
1) at least one defloculation agent, and
2) at least one additive chosen among organic binders, hydrogen peroxide and/or a powder of $U_3O_8$, these latter additives all playing the role of binder during the operation of atomisation-drying.

In the document EP-A-0 092 475 [7], the use of hydrogen peroxide is described for improving the resistance to compression of raw pellets of $UO_2$ or $UO_2UO_2$ —by forming a layer of hydrated oxide on the initial powder. This layer is formed by pulverising a solution of $H_2O_2$ on the metal oxide powder, the quantity of $H_2O_2$ solution representing 2 to 15% of the weight of this powder. In this case, the quantity of $H_2O_2$ used is significant.

The deflocculation agent is intended to fluidify the suspension. It can be constituted by an organic product which can be easily eliminated, for example ammonium polymethacrylate such as the product marketed by the company Polyplastic S.A. under the name DARVAN C which is a 25% aqueous solution of ammonium polymethacrylate.

The quantity by weight of the deflocculation agent used (ammonium polymethacrylate) generally represents 0.03 to 0.16% by weight of dry matter in the suspension.

The organic binders are added to the suspension to encourage agglomeration of the powder during drying in an atomiser. Organic binders which can be eliminated easily are chosen. As examples of such binders, polyvinyl alcohol and polyethylene glycol can be mentioned.

Oxygenated water can play the same role as an organic binder, as can a powder of $U_3O_8$, but in the two cases, it can be advantageous to add a small proportion of an organic binder as well.

Thus, according to a first embodiment of the invention, the solution comprises a deflocculation agent and an organic binder, the quantity by weight of the organic binder representing from 0.3 to 1% of the weight of the dry matter in suspension.

According to a second embodiment of the invention, the suspension comprises a deflocculation agent and hydrogen peroxide $H_2O_2$, without organic binder, the quantity by weight of $H_2O_2$ representing from 0.2 to 0.4% of the weight of dry matter in the suspension. Oxygenated water can be added under the form of aqueous solution at 20% $H_2O_2$, for example.

According to a third embodiment of the invention, the suspension comprises a deflocculation agent, hydrogen peroxide and an organic binder such as polyvinyl alcohol, the quantity by weight of $H_2O_2$ representing 0.1 to 0.4% of the weight of dry matter of the suspension, and the quantity by weight of the organic binder representing 0.1 to 0.5% of the weight of the dry matter of the suspension.

In these three embodiments, the quantity by weight of the deflocculation agent such as ammonium polymethacrylate generally represents from 0.03 to 0.16 of the weight of dry matter in the suspension.

In the two embodiments where an organic binder is used, this can be polyvinyl alcohol or polyethylene glycol.

When the additive is constituted of a powder of $U_3O_8$, this can be obtained by controlled oxidation of the initial $UO_2$ powder obtained by dry process. A quantity of $U_3O_8$ powder representing 10 to 20% of the weight of $UO_2$ can be used, for example 15%.

In this case, the suspension can also comprise a deflocculation agent and an organic binder such as those used above in the proportions indicated above, for example 0.03 to 0.16% by weight of the deflocculation agent and 0.1 to 0.5% by weight of the organic binder relative to the weight of dry matter in the suspension, that is the total weight of $UO_2$ and $U_3O_8$.

According to the invention, sintering admixtures under powder form can also be added to the powder suspension of $UO_2$ and possibly $U_3O_8$, such as $Cr_2O_3$, $TiO_2$, $Al_2O_3$ etc. and burnable poisons such as $Gd_2O_3$ or $Er_2O_3$. This makes it possible to obtain uniform dispersion of these admixtures and/or burnable poisons in the $UO_2$ powder.

According to the invention, the dry matter of the suspension can thus be constituted either of $UO_2$ powder alone, of the mixture $UO_2$—$U_3O_8$, or of $UO_2$-burnable poison mixtures and/or sintering admixture(s) and/or $U_3O_8$.

In order to prepare the suspension, one begins with a $UO_2$ powder obtained by dry process, in the raw state, and one gradually adds water, the additives and possible admixtures to the $UO_2$ powder and possibly $U_3O_8$, with mechanical or ultra-sound agitation, in one or several stages.

The following operation of atomisation-drying can be carried out in a standard atomisation-drying device, equipped for example with a turbine turning at high speed (centrifugal atomisation), with a nozzle fed under pressure (pressure or pneumatic atomisation) or an ultrasonic injection nozzle (sonotrode atomisation).

The setting of these different injection modes, either the diameter of the nozzle orifice, the rotation speed, the injection pressure or the ultrasonic frequency, must be carried out in such a way so as to produce the formation of a mist of micro-droplets in suspension, with for example an average diameter close to 50 $\mu$m with a low droplet diameter dispersion, if possible from 20 to 100 $\mu$m, no large-size droplet, for example of the order of a millimetre, being formed.

The drying atmosphere can be constituted of air or another gas exempt from oxygen, for example nitrogen or argon. The temperature of the gas is generally in the range between 150 and 300° C., at least in the zone located just next to the injection nozzle. The drying can be carried out either with the current or against the current of the suspension feed or in mixed mode. The drying height of the droplets is preferably higher than 70 cm with a temperature at the bottom of the drying column higher than 100° C. Preferably the atomisation-drying devices possess significant drying heights so as to obtain a final granulate with a minimum of residual humidity.

After this operation, a powder of $UO_2$ is obtained, with the following properties:
 a homogeneous particle size between 20 and 100$\mu$m,
 a granular cohesivity sufficient to withstand the different manipulations involved in preparing MOX fuels,
 excellent flow properties, such as spontaneous flow for 200 $\mu$m powder in a metallic flow meter provided with an orifice of diameter 15 mm,
 a high apparent density, close to 2 gm/cm$^3$,
 an O/U ratio less than 2.15,
 a low residual content of impurities,
 good compaction capacity, and
 excellent capacity for natural sintering giving, for example, after sintering, a density representing more than 97.5% of the theoretical density.

According to the invention, in certain cases one can use a supplementary thermal treatment of the powder obtained by atomisation-drying. This treatment can be carried out either at low temperature between 100 and 250° C. to eliminate residual humidity from the powder, or at a higher temperature of 250 to 700° C. to eliminate the totality of residual impurities from the powder, and if necessary set the O/U ratio by using an appropriate atmosphere for thermal treatment.

As far as the influence of thermal treatment is concerned, the morphology of the granulates changes very little during this treatment. In fact, they keep their sphericity and remain individualised, which makes it possible to preserve excellent flow properties.

Other properties and advantages of the invention will become clear by reading the following description of examples of embodiments, given as illustrative but non-limiting examples, with reference to the attached drawing.

BRIEF DESCRIPTION OF THE DRAWING

FIG. 1 shows a diagram in vertical section of a nuclearised device for atomisation-drying used in the invention. This device is set completely in a glove box.

DETAILED DESCRIPTION OF EMBODIMENTS

EXAMPLE 1

In this example, a powder of uranium dioxide is used coming from a conversion oven with tri-tubular concentric injector. This powder has the following properties:

- apparent density: close to 1 gm cm$^{-3}$,
- specific surface: close to 2.5 m$^2$ gm$^{-1}$,
- powder non-castable in a flow-meter of a diameter of 15 mm,
- average diameter of particles (measured by wet process laser diffraction): almost 1.5 $\mu$m with 50% fines lower than 1 $\mu$m.
- firing loss after sintering: close to 0.7% mass, and
- O/U ratio ranging from 2.04 to 2.08.

Using this powder, a suspension is prepared using 60 parts by weight of UO$_2$ powder and 40 parts by weight of distilled water.

Preferably the suspension operation of the powder of UO$_2$ in water is carried out in two stages, in such a way as to limit the phenomena of sedimentation, particularly prevalent with UO$_2$ which has a high intrinsic density.

40 parts of water are introduced in a Plexiglas or glass or stainless steel container, whose base does not have any sharp edges and whose walls are without any asperity. Then 40 parts by weight Of UO$_2$ powder are introduced into the container gradually, maintaining mechanical agitation of the suspension by means of a stirrer, equipped for example with a disperser of the rotor-stator type, at a stirring speed of the order of 1000 revs/min.

After introducing the 40 parts by weight of powder, an operation of disagglomeration-dispersion is carried out by means of the same stirrer at a speed of 1700 to 2000 revs/minute, for 20 minutes.

Then one adds 0.09% of the weight of dry matter of deflocculation product constituted by ammonium polymethacrylate, while still maintaining the suspension under agitation at a speed of 1000 revs/min.

Then the viscosity of the suspension is measured, for example using a BROOKFIELD DVII viscometer turning at a speed of 30 revs/minute, and one notes that it is lower than 20 mPa.sec.

Next, the rest of the UO$_2$ powder is added, that is 20 parts by weight, while still agitating at a stirrer speed of rotation of 1000 revs/minute.

Then a second disagglomeration-dispersion operation is carried out by means of the same stirrer at a speed of 3000 revs/minute, for 20 minutes, and one adds another 0.03% of the weight of dry matter of ammonium polymethacrylate while still agitating the suspension, at a speed of 1000 revs/minute.

Thus a total of 0.12% of the weight of dry matter of ammonium polymethacrylate has been introduced playing the role of deflocculation agent.

Next 0.2% of the weight of dry matter of oxygenated water is introduced into the suspension, then 0.4% of the weight of dry matter of polyvinyl alcohol, after stabilisation of the viscosity of the suspension. These additions are carried out while the suspension is still being stirred at a speed of about 1000 revs/minute. These two constituents play the role of binder and their role is to encourage the agglomeration of the powder during drying in an atomiser.

If the viscosity of the suspension is not lower than 250 mPa.sec, a small quantity of ammonium polymethacrylate is added. Preferably, the viscosity of the suspension is of the order of about 100 mPa.sec.

Then one carries out the granulation of the UO$_2$ powder, by atomisation-drying of the suspension.

This can be done by using the device shown in FIG. 1.

In this figure, it can be seen that the device comprises a chamber 1 inside which are:

- a peristaltic pump 3 for transferring the suspension introduced by 4 to the ultrasonic pulveriser 5. The pump flow can be adjusted between 0 and 2 litres/hour.
- an ultrasonic pulveriser 5 with an annular nozzle. The suspension is carried to the active crown of the pulveriser. The ultrasonic vibrations lead to the formation of a regular mesh of waves on the surface of the liquid. Each peak of the mesh leads to the formation of micro-droplets, whose diameter is directly linked to the vibration frequency. Several types of different frequency pulverisations make it possible to aim at particle sizes comprised between 10 and 200 $\mu$m. A pulveriser at 30 or 35 kHz is used making it possible to achieve particle sizes situated between about 30 and 50 $\mu$m. During operation, the pulveriser is cooled by air circulation at ambient temperature. Moreover, a cooling circuit for refrigerated water is envisaged at the level of the suspension feed, so as to maintain the latter at low temperature during injection. In fact, since the inlet of hot air takes place near the pulveriser, the ambient temperature at the level of the injector becomes very high (>100° C.) and could risk the suspension boiling before its injection. The refrigerated water feed is ensured by means of a circulation cryostat.
- an air circulation network comprising a ventilator-extractor 9 located at the outlet of the drying column 11. The air sucked in ahead of the atomiser 10 is brought to a high temperature by means of heating resistances 12 (temperature adjustable from 20 to 650° C.). This hot air is then injected close to the ultrasonic pulveriser in the centre of the drying column.
- a drying column 11.
- a metallic receiver cone 13 for the powder, linked to an air-particle separation cyclone 15 by a swan-neck metallic tube 17. A thermocouple located at the base of the receiver cone makes it possible to measure the temperature of the air continuously at the outlet from the drying column.
- a recuperation pot 19 for dry granulate, in the bottom part of the cyclone.

A filter with a handle 20 at the outlet from the cyclone makes it possible to catch particles of size greater than 1 $\mu$m.

In this device, the suspension of uranium dioxide is injected at a flow of 330 cm$^3$/hr and micro-droplets are formed of an average diameter of about 50 $\mu$m. Air is injected at the level of the injection nozzle at a temperature of about 180° C.

The temperature at the bottom of the drying column is close to 130° C. and the UO$_2$ powder is recuperated in the pot 19 located at the outlet from the air-particle separator cyclone 15 with a flow approaching 370 gm/hr. Thus one obtains a powder with the following properties:
- apparent density: 1.8 gm/cm$^3$,
- density after settlement: 2.0 gm/cm$^3$
- flow speed in a cone of diameter 15 mm: 39 gm/sec, and 13 gm/sec in a cone of diameter 9.5 mm, spontaneous flow,
- average diameter of granulates: 30 μm,
- granulate morphology: spherical granulates sometimes toric, with the presence of a low proportion of fines.
- ratio O/U: 2.13.

Thus one obtains a powder possessing the properties required for manufacturing MOX fuel.

EXAMPLE 2

In this example, one follows the same operational method as in example 1, but using polyethylene-glycol (PEG) as binder instead of polyvinyl alcohol. Equivalent results are obtained.

EXAMPLE 3

In this example, one follows the same operational method as in example 1, but using oxygenated water only without addition of polyvinyl alcohol. In this case, the proportion of oxygenated water represents 0.3% of the weight of dry matter. This rise in the hydrogen peroxide $H_2O_2$ content has the aim of limiting the proportion of particle fines in the absence of an organic binder (PVA or PEG). It brings about an increase in the O/U ratio of UO2, ΔO/U being of the order of 0.02 relative to the powder described in example 1. However, the flow properties of the final powder are lower than those of the powders described in examples 1 and 2.

EXAMPLE 4

In this example, one follows the same operational method as in example 1, but one carries out the two operations of disagglomeration-dispersion described for preparing the suspension, using an ultrasonic dispersion probe at a frequency close to 20 kHz. The length of agitation in this case is limited to 10 minutes per operation, for an injected power near to 150 W. With this method of dispersion, the temperature of the suspension rises considerably (up to about 80° C.) and causes significant evaporation of the water initially introduced. Then the quantity of water is readjusted to obtain a content of dry matter (that is of $UO_2$) of the order of 60% at ambient temperature.

In these conditions, one obtains a powder possessing properties equivalent to those of example 1.

EXAMPLE 5

In this example, one follows the same operational method as in example 1, but the $UO_2$ powder comprises a proportion of about 15% by weight of powder of $U_3O_8$ obtained by controlled oxidation of the initial $UO_2$ powder.

Then the two powders are mixed and put into suspension as in example 1 without addition of oxygenated water since $U_3O_8$ plays the role of binder of the powder during drying. Depending on the level of fines obtained after atomisation, one can add or not add a quantity representing 0.1 to 0.5% of the weight of dry matter of an organic binder constituted of polyvinyl alcohol or PEG.

Equivalent results are obtained.

EXAMPLE 6

From the powders obtained in examples 1 to 5, one prepares pellets of a diameter of 8 mm and height 10 mm, by cold compacting under a pressure of 500 mPa, without internal lubrication of the powder, followed by a sintering at 1700° C. for 4 hours with a rate of temperature rise of 100° C./hr. The properties of the products obtained are as follows:

Density after compacting: 6.4 gm/cm$^3$.

Density obtained after sintering: 98 to 99% of the theoretical density.

Firing loss observed after sintering: comprised between 1 and 2%.

Metallographic aspect after sintering: no cracking, little porosity and spread uniformly.

Average size of grains of the sintered pellet: comprised between 8 and 15 μm.

The temperature corresponding to the maximum densification speed by sintering is 1280° C.

Thus, the $UO_2$ powder obtained in conformity with the invention, possesses satisfactory specifications with properties equivalent to or even improved relative to the $UO_2$ powder used at present for manufacturing MOX fuels. In particular, it has good compactibility and excellent sinterability.

What is claimed is:

1. A process for preparing a powder of sinterable uranium dioxide $UO_2$ comprising:

i) preparing an aqueous suspension of a powder of $UO_2$ obtained by dry process conversion of uranium hexafluoride, wherein said suspension comprises 50 to 80% by weight of $UO_2$, and at least one additive selected from the group consisting of one or more deflocculation agents, one or more organic binders, hydrogen peroxide and a powder of $U_3O_8$, where the viscosity of the suspension does not exceed 250 mPa.sec; and ii) atomizing the suspension and drying the suspension in a hot gas, at a temperature of 150 to 300° C., to obtain the powder of $UO_2$ having an average particle size of 20 to 100μm.

2. The process according to claim 1, in which the suspension comprises at least one additive selected from the group consisting of at least one deflocculation agent, at least one organic binder, hydrogen peroxide and a powder of $U_3O_8$.

3. The process according to claim 1, in which the suspension comprises a deflocculation agent and an organic binder, the quantity by weight of the organic binder representing 0.3 to 1% of the weight of dry matter in the suspension.

4. The process according to claim 1, in which the suspension comprises a deflocculation agent and hydrogen peroxide, the quantity by weight of $H_2O_2$ representing 0.2 to 0.4% of the weight of dry matter in the suspension.

5. The process according to claim 1, in which the suspension comprises a deflocculation agent, hydrogen peroxide and an organic binder, the quantity of $H_2O_2$ representing 0.1 to 0.4% of the weight of dry matter in the suspension, and the quantity by weight of organic binder representing 0.1 to 0.5% of the weight of dry matter in the suspension.

6. The process according to claim 1, in which the suspension comprises $U_3O_8$ powder, the quantity of $U_3O_8$ representing 10 to 20% of the $UO_2$ weight.

7. The process according to claim 1, in which the suspension also comprises an organic binder in a quantity representing 0.1 to 0.5% of the weight of dry matter of the suspension.

8. The process according to claim 1, in which the deflocculation agent is ammonium polymethacrylate.

9. The process according to claim 1, in which the quantity by weight of the deflocculation agent represents 0.03 to 0.16% of the weight of dry matter in the suspension.

10. The process according to claim 1, in which the organic binder is polyvinyl alcohol or polyethylene glycol.

11. The process according to claim 1, in which one adds to the suspension a small quantity of powder of sintering admixture and/or burnable poison.

12. The process according to claim 1, in which the aqueous suspension is submitted to mechanical agitation or ultrasonic agitation.

13. The process according to claim 1, in which the atomization of the suspension is carried out by means of an ultrasonic injection nozzle, a turbine or a nozzle fed under pressure.

14. The process according to claim 1, which comprises a supplementary thermal treatment of the powder obtained by atomization-drying, at a temperature of 100 to 700° C.

15. A process for manufacturing fuel pellets comprising:
   i) preparing a castable powder of uranium dioxide by the process of claim 1 and admixing said powder with plutonium mixed oxide; and
   ii) casting said powder into pellets.

16. The process according to claim 1, wherein the powder of $UO_2$ has a particle size between about 30–50 $\mu$m.

* * * * *